Aug. 13, 1940.  A. L. FREEDLANDER  2,211,202
BELT
Filed Oct. 1, 1937  3 Sheets-Sheet 1
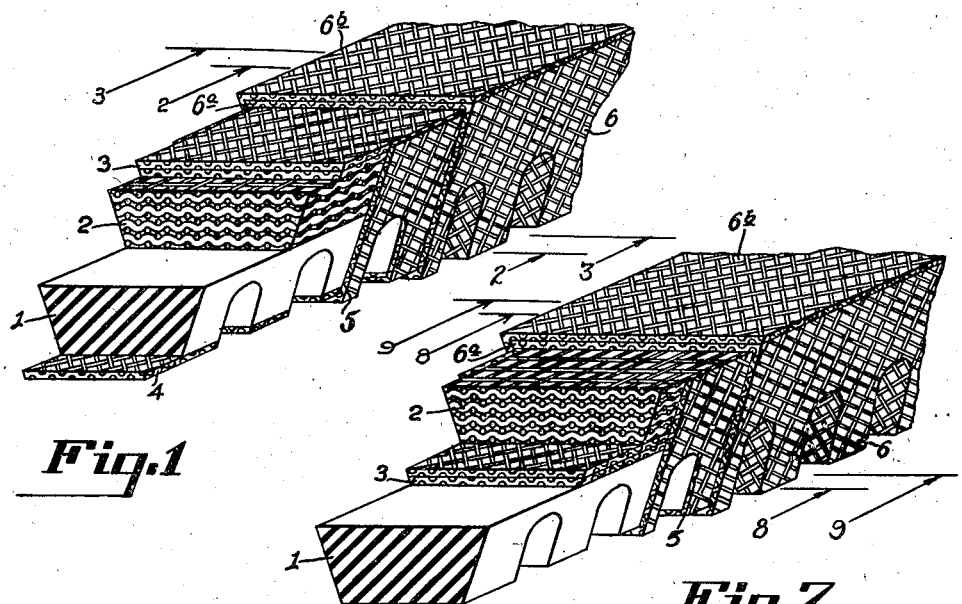
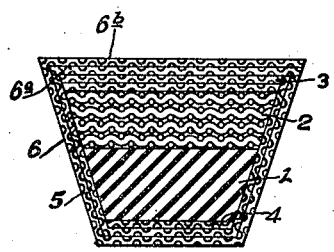
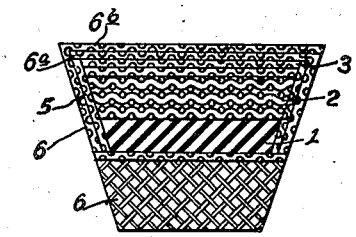
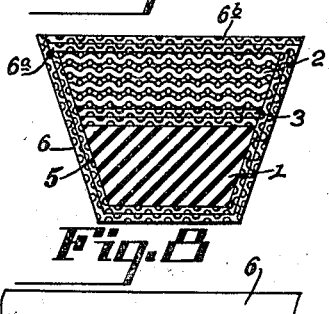
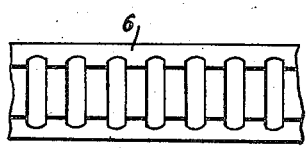
INVENTOR.
Abraham L. Freedlander
Toulmin & Toulmin
ATTORNEYS.

Aug. 13, 1940. A. L. FREEDLANDER 2,211,202
BELT
Filed Oct. 1, 1937 3 Sheets-Sheet 2

INVENTOR
Abraham L. Freedlander
Toulmin & Toulmin
ATTORNEYS.

Aug. 13, 1940.   A. L. FREEDLANDER   2,211,202
BELT
Filed Oct. 1, 1937    3 Sheets-Sheet 3
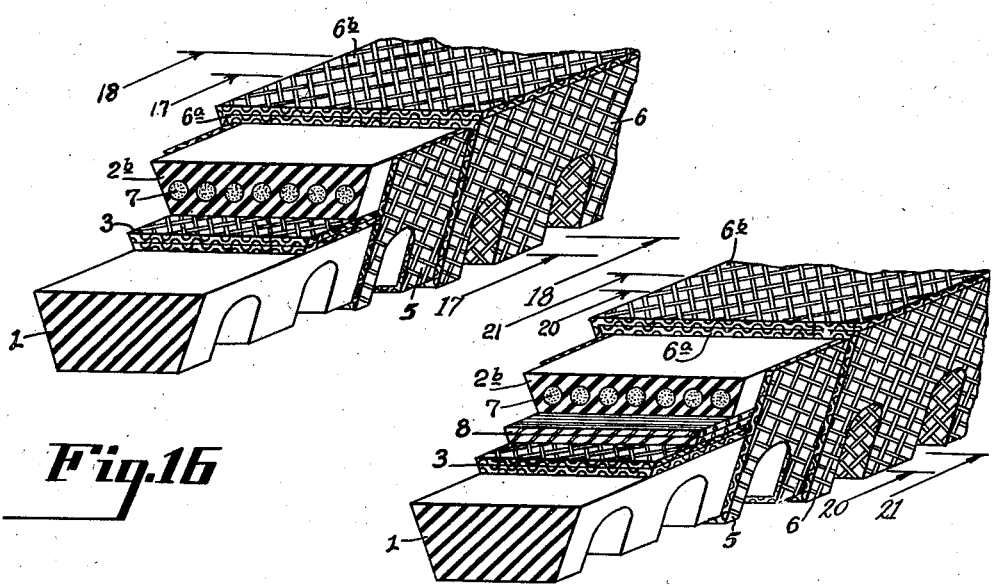
Fig.16
Fig.19
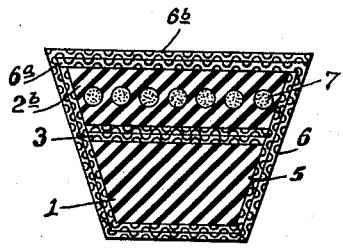
Fig.17
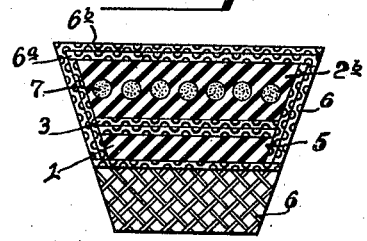
Fig.18
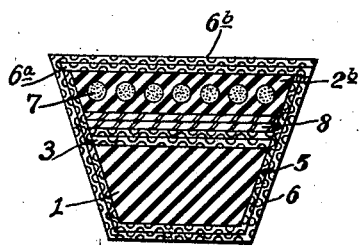
Fig.20
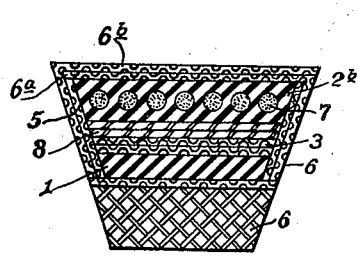
Fig.21
INVENTOR
Abraham L. Freedlander
Toulmin & Toulmin
ATTORNEYS.

Patented Aug. 13, 1940

2,211,202

UNITED STATES PATENT OFFICE 2,211,202

BELT

Abraham L. Freedlander, Dayton, Ohio, assignor to The Dayton Rubber Manufacturing Company, Dayton, Ohio, a corporation of Ohio Application October 1, 1937, Serial No. 166,838

5 Claims. (Cl. 74—233)

This invention relates to belts and particularly to V-belts.

It is an object of this invention to provide a V-belt which, in operation, is strong and relatively inextensible and which is extremely flexible about transverse axes in such manner as to accommodate itself, in operation, to grooved pulleys of various diameters without the production in the belt of harmful internal stresses or destructive strains.

It is a further object of this invention to provide a V-belt of such construction that the neutral axis thereof is disposed adjacent the outer side thereof.

It is a further object of this invention to provide such a belt in which the belt body is formed of a plurality of sections of materials having different properties, wherein the lower or inwardly disposed section is formed of resilient material such as rubber reinforced by the incorporation therein of fine transversely disposed parallel textile fibers, whereby to brace the resilient section or body against transverse compressive forces.

It is a further object of this invention to provide in such a belt structure a section formed of a plurality of plies of rubberized bias-laid square woven textile fabric in order to relieve from the strength band a portion of the longitudinal stress set up in the belt in operation.

It is a further object of this invention to provide such a compression section of fiber reinforced rubber or "Stiflex" which is provided with teeth formed therein and extending only partially therethrough from the inner or lower side thereof in such manner that the fiber reinforced rubber or "Stiflex" above the interstices between the teeth provides means for resiliently connecting the teeth of the compression section.

It is a further object of this invention to provide, in such a belt construction, means for reinforcing the inner or lower surfaces of the teeth of the compression section.

It is a further object of this invention to provide, in such a belt construction, a wrapper comprising a plurality of superposed cover members adapted to encase the belt body and protect it from wear and the attack of injurious foreign substances such as oil and the like.

It is a further object of this invention to provide such a wrapper which comprises an inner cover member adapted to encase the lower sides of the teeth of the compression section and the sides of the belt and a superposed outer cover encasing all portions of the teeth and of the side and top or outer surfaces of the belt and which is fully overlapped upon the outer surface of the belt in order to strengthen the outer or tension section of the belt, while increasing the strength of the belt against torsional stresses.

It is a further object of this invention to provide such a belt construction, wherein the belt body is formed of three main portions, namely, a toothed compression section formed of "Stiflex" or fiber-reinforced rubber upon which is superposed a strength band adapted to include therein the neutral axis of the belt and formed of straight-laid square woven rubberized textile fabric and upon which strength band or strength section is superposed a reinforcing member or section comprising a plurality of plies of rubberized bias-laid square woven textile fabric.

It is a further object of this invention to provide such a belt construction wherein the lastnamed section comprising plural plies of rubberized bias-laid square woven fabric is disposed between the section of "Stiflex" or fiber-reinforced rubber and the strength band formed of straight-laid square woven rubberized fabric.

It is a further object of this invention to provide such a belt construction and method of manufacture thereof, wherein the respective sections are assembled, encased by the wrapper and vulcanized in a suitable mould previously to the cutting of teeth through the wrapper and the compression section of the belt.

It is a further object of this invention to provide, in such a belt construction, a belt body particularly adapted for use with grooved pulleys of small diameter, which body has the inner or compression section provided with teeth and formed of "Stiflex" or textile fiber reinforced rubber and has the tension section thereof formed of the same material and spaced from the compression section by an intermediate section comprising one or more plies of bias laid square woven rubberized fabric.

It is a further object of this invention to provide a belt having such a body and a wrapper therearound and vulcanized thereto and comprising an inner cover member through which the teeth are cut and a superposed outer cover member providing full coverage for all surfaces of the belt and overlapped on the top or outer surface of the belt to provide a two-ply cover for the outside surface of the belt.

It is a further object of this invention to provide such a belt construction wherein the tension section of the belt is formed of rubber having disposed therein large parallel tension cords extending in the direction of the longitudinal axis of the belt.

It is a further object of this invention to provide such a construction wherein the rubber of the tension section which surrounds the longitudinal tension cords is reinforced with fine parallel transversely disposed textile fibers to form a tension section comprising "Stiflex" having the longitudinal tension cords embedded therein.

It is a further object of this invention to provide, in such a belt structure, a belt body comprising four sections, namely, a toothed inner or compression section formed of rubber or "Stiflex" upon which is superposed a section comprising one or more plies of bias-laid square woven rubberized fabric upon which is superposed a third or lateral stiffening section comprising rubberized transversely disposed textile cords upon which is superposed the outer or tension section of the belt comprising rubber or "Stiflex" having embedded therein a plurality of parallel longitudinally disposed tension cords.

These and other objects and advantages will appear from the following description taken in connection with the drawings.

In the drawings:

Figure 1 is a view, in perspective, of a cut-away portion of a belt constructed according to this invention;

Figure 2 is a section taken on the plane designated by lines 2—2 of Figure 1;

Figure 3 is a section taken on the plane designated by lines 3—3 in Figure 1;

Figure 4 is a fragmentary diagrammatic top plan view of the belt illustrated in Figures 1, 2 and 3.

Figure 5 is a fragmentary diagrammatic bottom plan view of the belt illustrated in Figures 1, 2 and 3;

Figure 6 is a fragmentary diagrammatic side elevational view of the belt illustrated in Figures 1 to 5 inclusive;

Figure 7 is a view similar to Figure 1 of a modified form of belt constructed according to the principles of this invention;

Figure 8 is a section taken on the plane designated by lines 8—8 in Figure 7;

Figure 9 is a section taken on the plane designated by lines 9—9 in Figure 7;

Figure 16 is a perspective view similar to Figures 1, 7, 10 and 13, of a fourth modified form of belt constructed according to the principles of this invention;

Figure 17 is a section taken on the plane designated by lines 17—17 in Figure 16;

Figure 18 is a section taken on the plane designated by lines 18—18 in Figure 16;

Figure 19 is a perspective view similar to Figures 1, 7, 10, 13 and 16, of a fifth modified form of belt constructed according to the principles of this invention;

Figure 20 is a section taken on the plane designated by lines 20—20 in Figure 19; and Figure 21 is a section taken on the plane designated by lines 21—21 in Figure 19.

Figure 10:
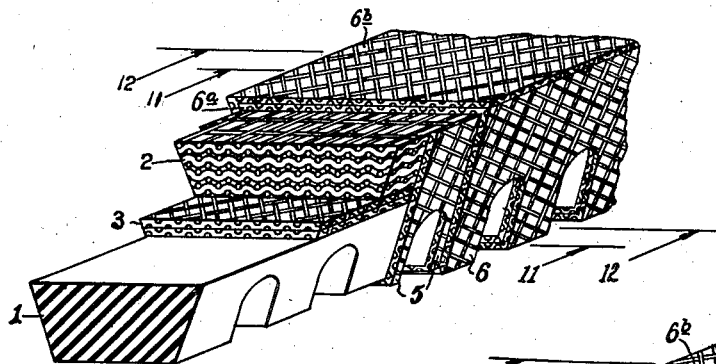
Figure 10 is a perspective view similar to Figures 1 and 7, of a second modified form of belt constructed according to the principles of this invention.

Referring to the drawings in detail and with reference particularly to Figures 1, 2 and 3, the belt therein illustrated comprises the compression section 1 formed of rubber reinforced with fine parallel textile fibers disposed transversely therein, upon which is superposed the strength band or strength section 2, which is formed of a plurality of plies of rubberized straight-laid square woven textile fabric secured together in graduated tension and upon which strength band or section 2 is superposed the section 3 formed of one or more plies of rubberized bias-laid square woven textile fabric.

In order to strengthen the teeth formed in the compression section 1, the lower surfaces thereof are provided with a cover 4 formed of rubberized bias-laid square woven fabric. The tooth covering 4 is preferably secured to the compression section 1 before the teeth are cut therein and, in cutting the teeth, it is preferable that, as shown, the interstices between adjacent teeth terminate at a substantial distance below the upper surface of the compression section 1 in order that a portion of the material of the compression section 1 should extend from tooth to tooth and thus form a reinforcing and cushioning section between the teeth.

Enclosing the sides of the belt and the inside or lower side of the tooth covering 4 is the inner cover member 5 which is also formed of bias-laid square woven rubberized fabric. This inner cover member 5 is preferably applied to the body of the belt before the teeth are cut therefrom.

Disposed about the inner cover member 5 is the outer cover member 6 which is applied after the teeth are cut into the compression section 1 after the tooth covering member 4 and inner cover member 5 have been applied to the belt. The outer cover member 6 is also formed of bias-laid rubberized square woven textile fabric and the outer cover member 6 is fully overlapped at the outer or upper side of the belt, as shown at 6a, 6b in order to fully protect the belt and strengthen the cover thereof.

While the tooth covering 4 has been designated as comprising a single ply, it is, of course, to be understood that it may comprise a greater number of plies secured together to provide additional strength to the inner tooth surfaces, where such additional strength is necessary or desirable. It is likewise to be understood that the section 3 may comprise either one ply or any number of plies as may be required for the conditions of usage to which the belt is to be subjected.

The material of which the compression section 1 is formed, namely, rubber reinforced with fine parallel textile fibers disposed transversely of the section 1 and the belt, is generally known in the art under the name of "Stiflex." The transverse reinforcements in the material greatly increase the lateral incompressibility thereof while, in no wise, decreasing, and in some instances increasing, the bendability or flexibility of the compression section about transverse axes which are defined by the transversely arranged textile fibers or the rubber disposed therebetween.

The presence of these fibers in the material substantially decreases the impact of the side surfaces of the respective belt teeth upon the driving pulley, because, while the yieldability of the material is not appreciably decreased, nevertheless the elasticity or "bounce" of the fiber impregnated rubber is substantially less than that of rubber unprovided with such reinforcement. The reinforcement thus substantially increases the lateral incompressibility of the compression section 1, while also decreasing the bounce or impact of the teeth upon a driving pulley without, in any way, decreasing, but on the contrary, in some instances, increasing the flexibility or bendability of the compression section 1 about transverse axes.

The strength band or strength section 2 is preferably so disposed as to have the neutral axis of the belt disposed therein. The neutral axis of the belt represents the demarcation between parts in tension and parts in compression. In forming the section 2, the plies of straight laid square woven rubberized fabric are preferably wound upon one another at graduated tension, i. e., the lower or inner plies will give greater tension than the outer plies and the tension of the respective plies decreases progressively from the inner or lower ply to the outer or upper ply.

Due to this graduated tension of the plies of the strength section 2, this section normally tends to draw the belt into circular form and, as the strength band or section 2 is, in effect, the backbone of the belt and adapted to supply the greater portion of the tensile strength thereof, this graduated tension in the strength section 2 materially aids the belt in conforming to acutely arcuate surfaces of grooved driving pulleys of small diameter.

The term "straight-laid" indicates that the threads of the square woven fabric of the section 2, which extend in one direction are disposed substantially parallel to the longitudinal axis of the belt, while the other threads which are substantially perpendicular thereto are disposed transversely of the belt.

The transversely disposed threads serve to aid the bending of the strength section 2, in operation of the belt, while the longitudinally disposed threads impart substantial tensile strength to the strength band or section 2. The tooth covering 4 and the section 3 are formed, as above described, of bias-laid square woven rubberized textile fabric and the term "bias-laid" indicates that the threads, as illustrated, are all disposed diagonally with respect both to the longitudinal and transverse axes of the material and the belt. The provision of the section 3 materially increases the tensile strength of the strength section 2, because it limits, in a sense, the extensibility of the strength section 2.

The provision of two-ply covering of the side or driving surfaces of the belt by the inner cover member 5 and outer cover member 6 maintains the noise of the belt in operation at a minimum value. The wrapper of the belt which comprises the inner cover member 5 and outer cover member 6 provides, with the reinforcing to the covering 4, three-ply protection for the inner or lower surfaces of the teeth and the outer cover member 6 of the wrapper which extends over the interstices between the teeth, provides full coverage of the belt and thus protects all portions of the belt body against contact with oil and other destructive foreign substances. The outer cover member 6, due to the full overlapping at 6a, 6b, imparts additional strength to the belt, while insuring, due to the great area of overlapping, against entry of foreign substances through the outer cover member 6.

The full overlapping of the outer cover member 6 also provides a flat, continuous outer surface for the belt, as shown in Figure 4. Figure 4, along with Figures 2, 3, 5 and 6, clearly shows the shape of the belt. As is seen particularly in Figure 3, the termination of the interstices between the teeth at a substantial distance below the upper surface of the compression section 1 provides a substantial resilient connecting body between adjacent teeth.

In the belt construction illustrated in Figures 7, 8 and 9, the respective sections 1, 2 and 3 are formed of the same material as correspondingly numbered sections in the form illustrated in Figures 1 to 6 inclusive. However, the section 3 of bias-laid square woven fabric is disposed outside and adjacent the compression section 1 and between the compression section 1 and the neutral axis section or strength section 2; and, while it is in some cases desirable to retain the tooth reinforcing covering 4 on the teeth, in the construction illustrated in Figures 7, 8 and 9, this member has been omitted.

The placing of the neutral axis including tension section or strength band 2 outside the intermediately placed bias-laid fabric section 3 places the neutral axis of the belt more nearly adjacent the outside thereof than in the construction illustrated in Figures 1 to 6 inclusive. This practice is preferable where the belt is to be used with driving pulleys of substantial diameter, because the arc provided by such pulleys is sufficiently great to permit the belt to make sufficiently acute bends.

Due to the placing of the neutral axis of the belt more nearly adjacent the outer portion of the belt than in the construction illustrated in Figures 1 to 6, the bendability or flexibility of the belt is somewhat reduced and this reduction in no wise affects the satisfactory operation of the belt when used with grooved pulleys of sufficiently large diameter, but on the contrary leads to satisfactory and substantially noiseless operation of the belt under larger loads than could be accommodated by similar belts wherein the neutral axis was disposed more nearly adjacent the lower or inner surface of the belt.

Figure 11:
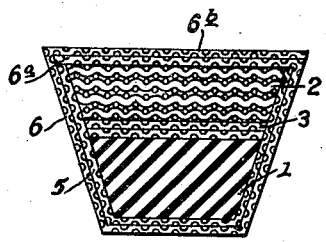
Figure 11 is a section taken on the plane designated by lines 11—11 of Figure 10.
Figure 12:
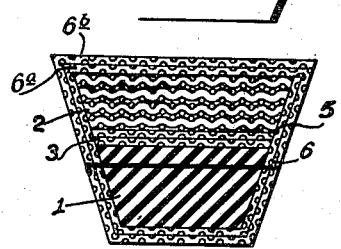
Figure 12 is a section taken on the plane designated by the lines 12—12 in Figure 10.

In the second modified belt structure illustrated in Figures 10, 11 and 12, the compression section 1, intermediate section 3 and strength band or section 2 are formed of the same materials as correspondingly numbered sections in the constructions illustrated in Figures 1 to 9 inclusive, and the arrangement thereof is the same as is illustrated in Figures 7, 8 and 9. However, while the inner cover member 5 and outer cover member 6 are formed of bias-laid rubberized square woven textile fabric, as in the above-described constructions, the teeth are cut therein after the sections 1, 2 and 3 have been assembled and covered by the inner cover member 5 and outer cover member 6 and the belt vulcanized into an integral member.

While this construction does not provide an outer cover member 6 which extends over all surfaces of the belt and protects the portions of the compression section 1 between the interstices of the teeth, the omission of this protection of the teeth, however, substantially increases the flexibility of the belt and makes it possible to use a belt having the body thereof constructed in the same manner as that illustrated in Figures 7, 8 and 9 about pulleys of substantially lesser diameter than may satisfactorily accommodate a belt constructed according to Figures 7, 8 and 9, wherein the outer cover member 6 fully covers the exterior of the belt including the interstices between adjacent teeth.

The belt construction illustrated in Figures 10, 11 and 12, therefore, may operate under conditions wherein protection is of secondary importance, with all the advantages of a belt constructed according to Figures 7, 8 and 9; and, in addition, increased flexibility permitting its use with pulleys of lesser diameter than pulleys which may satisfactorily accommodate a belt construction such as that of Figures 7, 8 and 9.

Figure 13:
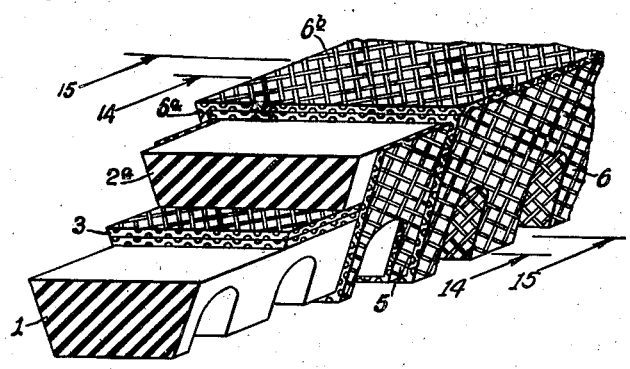
Figure 13 is a perspective view similar to Figures 1, 7 and 10, of a third modified form of belt constructed according to the principles of this invention.
Figure 14:
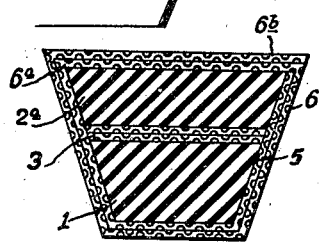
Figure 14 is a section taken on the plane designated by lines 14—14 in Figure 13.
Figure 15:
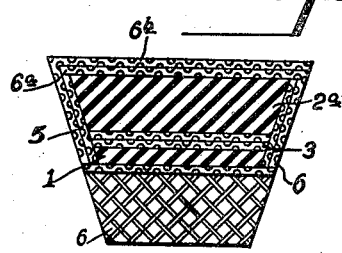
Figure 15 is a section taken on the plane designated by lines 15—15 in Figure 13.

In Figures 13, 14 and 15, I have illustrated a third modified form of belt construction, wherein the tension section or strength section of the belt is constructed of "Stiflex" or rubber reinforced with fine parallel transversely disposed textile fibers instead of straight-laid square woven rubberized textile fabric. This section is designated 2a and is disposed outside and adjacent, or above and adjacent the intermediate section 3 of bias-laid rubberized square woven fabric which, in turn, is superposed upon the compression section I in the same manner as in the construction illustrated in Figures 10, 11 and 12. This strength or tension section 2 is adapted to have the neutral axis of the belt included therein as in the section 2 of the construction illustrated in Figures 10, 11 and 12.

Due to the fact that the "Stiflex" or textile fiber reinforced rubber of the member 2a is more flexible and extensible than the straight-laid textile fabric of the member 2 of Figures 10, 11 and 12, the belt illustrated in Figures 13, 14 and 15 is more flexible than that illustrated in Figures 10, 11 and 12. The bias-laid rubberized square woven fabric of the intermediate section 3 provides substantial reinforcement against torsional stress and prevents the belt from turning over upon itself in grooved pulleys in which it is too loosely fitted. The material of the compression section I and tension section 2a being substantially laterally incompressible, and due to the fact that the wrapper comprising the inner cover member 5 and outer cover member 6 provides a two-ply covering of the inclined side walls or driving surfaces of the belt, the belt construction illustrated in Figures 13, 14 and 15 will operate quite silently over pulleys of extremely slight diameter, where the load is insufficient to require the provision of the utmost tensile strength in the belt. The termination of the interstices between the teeth of the compression section I, below the top surface of the compression section I, provides a resilient cushioning and reinforcing connection between adjacent teeth of the compression section I, as pointed out above.

In the construction illustrated in Figures 16, 17 and 18, the compression section I is formed of "Stiflex" or rubber reinforced with embedded fine parallel transversely disposed textile fibers in the same manner as in the constructions of Figures 1 to 15 inclusive, and the intermediate section 3, which is superposed upon the tension section I, is formed of bias-laid rubberized square woven fabric in the same manner as in the constructions illustrated in Figures 7 to 15 inclusive. The tension section, however, which is designated 2b, is provided with longitudinally disposed tension cords 7 of substantial diameter, which are arranged substantially parallel to the longitudinal axis or length of the belt.

The surrounding material of the section 2b may be formed either of rubber or "Stiflex" which, as above explained, comprises rubber reinforced by the incorporation therein of extremely fine parallel transversely disposed textile fibers which are so fine as to be incapable of being seen by the naked eye. The wrapper comprises the inner cover member 5 and outer cover member 6 fully overlapped upon the top or outer surface of the tension section 2b at 6a, 6b in the same manner as in the constructions illustrated in Figures 1 to 15 inclusive.

By the provision of the longitudinally disposed tension cords 7 in the body material in the tension section or strength band 2b of the belt, which has the neutral axis of the belt included therein, the advantages of the flexibility of the construction illustrated in Figures 13 to 15 inclusive is achieved with increase of tensile strength of the belt, which enables it to handle relatively larger loads than are capable of being handled by the construction illustrated in Figures 13 to 15 inclusive. This belt construction may be utilized on grooved pulleys of relatively slight diameter and for handling heavier loads than might be safely and satisfactorily handled by the construction of Figures 13 to 15 inclusive.

I have illustrated in Figures 19 to 21 inclusive a fifth modified form of belt constructed according to the principles of this invention, wherein the body of the belt comprises the "Stiflex" toothed compression section I, similar to the compression section I of Figures 16 to 18, upon which is superposed the intermediate section 3 of bias-laid rubberized square woven fabric similar to the section 3 of Figures 16 to 18, and the tension section 2b is formed in the same manner and of the same materials as the section 2b of the construction illustrated in Figures 16 to 18. The modification in the structure of the belt body comprises the provision of the layer strengthening section 8 which is disposed between the tension section 2b and the intermediate section 3.

This lateral strengthening section 8 comprises transversely disposed cords arranged in one or more layers and embedded in rubber, as shown in Figures 19, 20 and 21. This lateral stiffening section 8 imparts to the belt construction a substantial increase in bendability or flexibility about transverse axes, which permits of the use of the belt construction illustrated in Figures 19, 20 and 21 in satisfactory manner with pulleys of substantially less diameter than may satisfactorily accommodate the belt construction illustrated in Figures 16, 17 and 18.

However, due to the retention of the longitudinally disposed tension cords 7 in the tension section 2b, the tensile strength of the belt construction illustrated in Figures 16, 17 and 18 is retained, while the flexibility of that construction is substantially increased by the provision of the lateral stiffening section 8. The disposition of the cords of the lateral stiffening section 8 transversely of the belt substantially increases the lateral incompressibility of the belt, because of the disposition of the opposite ends of the cords of the section 8 toward the inner cover member 5. The cords of the lateral stiffening section 8, in addition, serve, in effect, as heat conducting conduits and conduct heat caused by internal friction outwardly to the wrapper comprising inner cover member 5 and outer cover member 6, which wrapper, in moving through the air, transfers the heat to the air.

In the manufacture of the belt constructions illustrated in Figures 1 to 21, the tension section 1 and other sections of the belt body are formed and assembled and the inner cover member 5 is placed therearound. In the constructions illustrated in Figures 1 to 9 inclusive and 13 to 21 inclusive, the compression section 1 is then cut away to form interstices between the respective teeth, which interstices extend through the inner cover member 5. The outer cover member 6 is then placed about the belt body and inner cover member 5 and overlapped at 6a, 6b, and the assembled belt structure is then placed in a mould and subjected to heat and pressure for vulcanizing the sections of the belt body and the inner and outer cover members of the wrapper into a single integral body.

In the construction illustrated in Figures 10, 11 and 12, the sections of the belt body are formed and assembled; the inner cover member 5 is placed about the inner and side surfaces of the body and the outer cover member 6 is then placed about the belt body and inner cover member 5 and overlapped thereon at 6a, 6b, after which the assembled belt structure is placed in a mould and vulcanized. The vulcanized belt structure is then cut away to form teeth, as shown in Figure 10, wherein the interstices between the teeth extend through the inner cover member 5 and outer cover member 6 of the belt wrapper.

It is, of course, to be understood that the shearing of the teeth from the belt may be accomplished, where desired, by cutting away the material from the interstices between the teeth after the sections of the body, and inner and outer cover members of the wrapper have been assembled together and before they have been placed in the mould for vulcanization. In that case, after the teeth have been cut through the compression section 1 and inner and outer cover members of the belt wrapper, the assembled structure is placed in a mould and subjected to heat and pressure to vulcanize all parts of the belt into one complete integral unit or body.

It is, of course, to be understood that the wrapper construction illustrated in Figures 10, 11 and 12, wherein the interstices between the teeth extend through the inner and outer cover members of the wrapper, may be applied to other forms of belts illustrated in Figures 1 to 9 and Figures 13 to 21 inclusive. It is likewise to be understood that the number of plies of straight-laid and bias-laid square woven rubberized fabric used in the respective portions of the belt may be modified to meet widely varied conditions of operation. Furthermore, the proportions of the belt and the respective component sections thereof will necessarily be varied to meet varying conditions of intended usage.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a V-belt with inclined side driving surfaces, a belt body including an inwardly disposed compression section of "Stiflex" and having depressions extending transversely thereof forming teeth, a strength section above and adjacent said compression section formed of multiple plies of straight-laid square woven rubberized fabric arranged under graduated tension and adapted to have the belt neutral axis disposed therein, and a wrapper enclosing said belt body comprising an inner cover member enclosing at least a portion of said teeth and side surfaces of said belt body, and an outer cover member covering said inner cover member.

2. In a V-belt with inclined side driving surfaces, a belt body including an inwardly disposed compression section of "Stiflex" and having depressions extending transversely thereof forming teeth, a strength section above and adjacent said compression section formed of multiple plies of straight-laid square woven rubberized fabric arranged under graduated tension and adapted to have the belt neutral axis disposed therein, and a wrapper enclosing said belt body comprising an inner cover member enclosing at least a portion of said teeth and side surfaces of said belt body, and an outer cover member covering said inner cover member, said inner and outer cover members being formed of rubberized square woven fabric.

3. In a V-belt with inclined side driving surfaces, a belt body including an inwardly disposed compression section of "Stiflex" and having depressions extending transversely thereof forming teeth, a strength section above and adjacent said compression section formed of multiple plies of straight-laid square woven rubberized fabric arranged under graduated tension and adapted to have the belt neutral axis disposed therein, and a wrapper enclosing said belt body comprising an inner cover member enclosing at least a portion of said teeth and side surfaces of said belt body, and an outer cover member covering said inner cover member, said inner and outer cover members being formed of rubberized bias-laid square woven fabric.

4. In a V-belt with inclined side driving surfaces, a belt body including an inwardly disposed compression section of "Stiflex" and having depressions extending transversely thereof forming teeth, a strength section above and adjacent said compression section formed of multiple plies of straight-laid square woven rubberized fabric arranged under graduated tension and adapted to have the belt neutral axis disposed therein, and a wrapper enclosing said belt body comprising an inner cover member enclosing at least a portion of said teeth and side surfaces of said belt body, and an outer cover member covering said inner cover member, said belt body having an intermediate section of bias-laid square woven rubberized fabric between said compression section and said strength section.

5. In a V-belt with inclined side driving surfaces, a belt body including an inwardly disposed compression section of "Stiflex" and having depressions extending transversely thereof forming teeth, a strength section above and adjacent said compression section formed of multiple plies of straight-laid square woven rubberized fabric arranged under graduated tension and adapted to have the belt neutral axis disposed therein, and a wrapper enclosing said belt body comprising an inner cover member enclosing at least a portion of said teeth and side surfaces of said belt body, and an outer cover member covering said inner cover member, said outer cover member being fully overlapped at the outer or upper side of the belt body to protect and strengthen said belt.

ABRAHAM L. FREEDLANDER.